(12) United States Patent
Remmel

(10) Patent No.: US 7,025,402 B2
(45) Date of Patent: Apr. 11, 2006

(54) VEHICLE STRUCTURE

(75) Inventor: Roger Remmel, Remscheid (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 0 days.

(21) Appl. No.: 10/477,957

(22) PCT Filed: May 17, 2002

(86) PCT No.: PCT/DE02/01827

§ 371 (c)(1),
(2), (4) Date: Nov. 17, 2003

(87) PCT Pub. No.: WO02/092370

PCT Pub. Date: Nov. 21, 2002

(65) Prior Publication Data

US 2004/0150247 A1    Aug. 5, 2004

(30) Foreign Application Priority Data

May 17, 2001   (DE)   ................................ 101 24 283

(51) Int. Cl.
*B60P 7/04* (2006.01)
(52) U.S. Cl. ........................ 296/100.12; 296/100.13; 296/100.15; 296/100.18
(58) Field of Classification Search ........... 296/100.01, 296/100.12–100.18, 160, 163, 168, 182.1, 296/186.2, 186.4, 105; 105/377.02
See application file for complete search history.

(56) References Cited

U.S. PATENT DOCUMENTS

| 4,092,039 | A | * | 5/1978 | Lutkenhouse | ............ 296/26.05 |
|---|---|---|---|---|---|
| 4,129,331 | A | * | 12/1978 | Lawson et al. | ........ 296/100.14 |
| 4,625,654 | A | * | 12/1986 | Kuss et al. | ............. 105/377.02 |
| 5,050,924 | A | * | 9/1991 | Hansen | ................... 296/100.15 |
| 5,338,084 | A | * | 8/1994 | Wardell | ....................... 296/105 |
| 5,944,039 | A | * | 8/1999 | Bergeron | ..................... 135/119 |
| 6,065,796 | A | * | 5/2000 | Verduyn | ................ 296/100.12 |
| 6,561,564 | B1 | | 5/2003 | Fliege et al. | |
| 6,634,697 | B1 | * | 10/2003 | Petelka | .................. 296/100.12 |

FOREIGN PATENT DOCUMENTS

| DE | 197 56 865 | 6/1999 |
|---|---|---|
| EP | 0 864 613 | 6/1998 |
| EP | 0 936 093 | 8/1999 |
| WO | 00/12334 | 3/2000 |
| WO | 00/12337 | 3/2000 |

* cited by examiner

*Primary Examiner*—D. Glenn Dayoan
*Assistant Examiner*—Greg Blankenship
(74) *Attorney, Agent, or Firm*—Davidson, Davidson & Kappel, LLC

(57) ABSTRACT

A vehicle structure, especially a vehicle structure for utility vehicles such as motor vehicles and rail vehicles, wherein a covering frame is supported on a loading platform, covering a loading area. A roof skin can be placed on displaceable cross members of the covering frame, whereby at least one flexible reinforcing member is arranged in an upper area of the covering frame in order to reinforce the roof. The inventive vehicle structure has low deflection as a result of the fact that at least one flexible reinforcing member is fixed to a front corner area of the covering frame and to a rear displaceable cross member in the region of the longitudinal side thereof, at least one flexible reinforcing member being maintained in at least one point of traction in an area of the other longitudinal side.

27 Claims, 7 Drawing Sheets

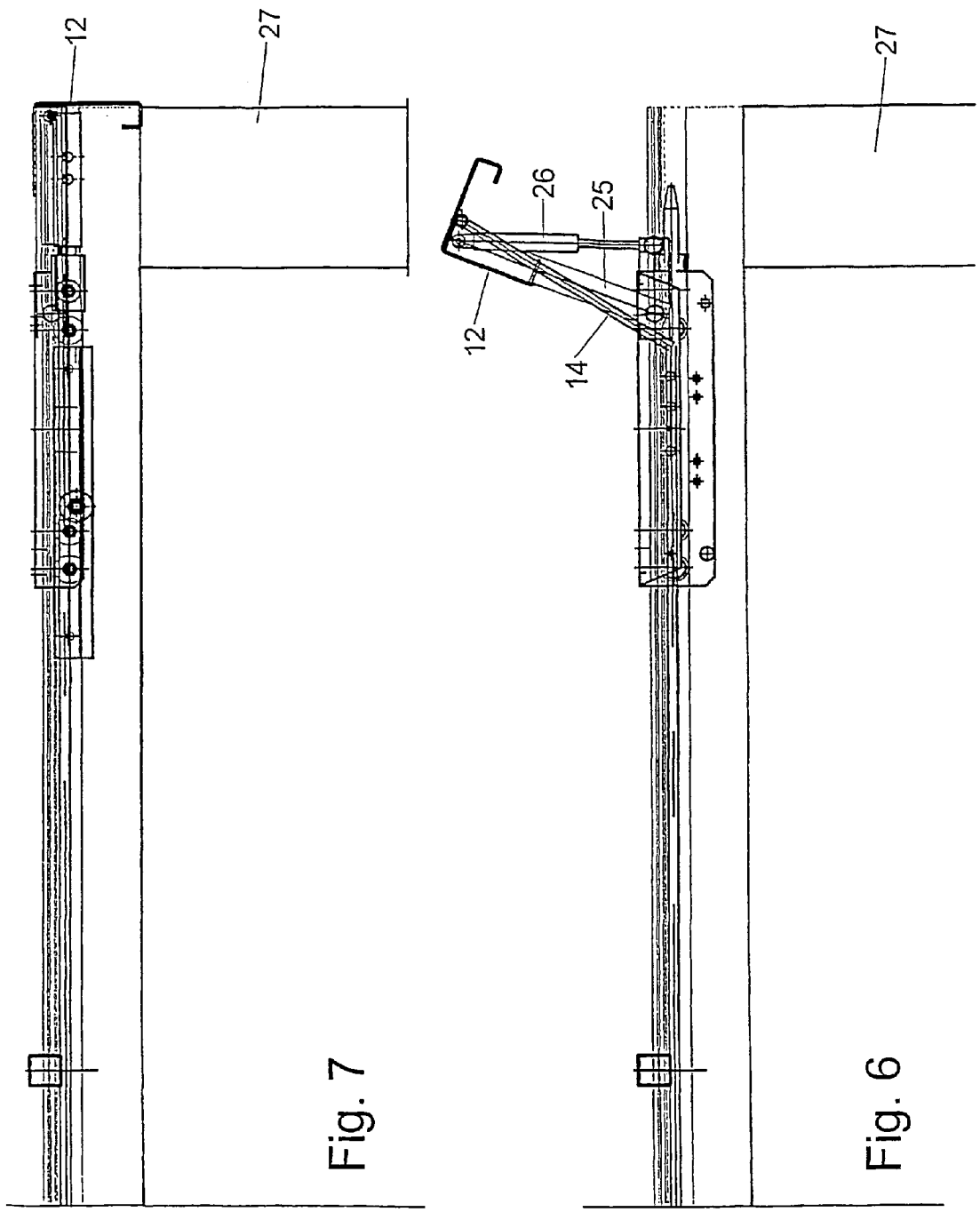

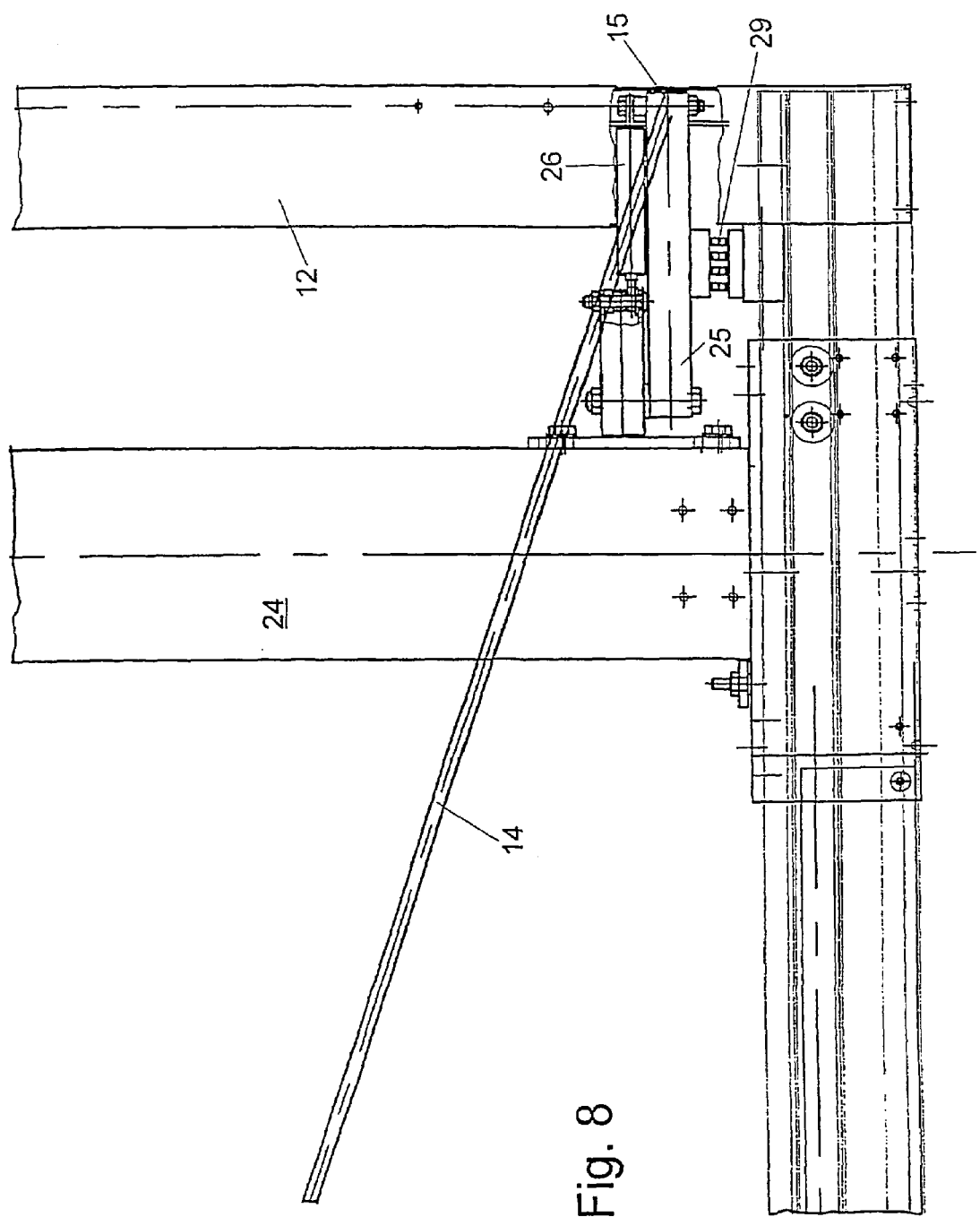

VEHICLE STRUCTURE

BACKGROUND

The invention relates to a vehicle structure, in particular for utility vehicles, such as motor vehicles and rail vehicles, in which a covering frame is supported on a loading platform and covers a loading area, it being possible for a roof skin to be attached to moveable bows of the covering frame, and in which at least one flexible reinforcing member is arranged in an upper region of the covering frame in order to stiffen the roof.

In road and rail vehicles and containers known from practice, the load is to be transported as securely as possible. In addition, the loading and unloading is to take place as rapidly as possible in order to be able to return the vehicle etc. as rapidly as possible to its transporting function again. Customary vehicle superstructures enabling the loading platform to be opened up comprise sliding-hoop-type coverings or sliding coverings. A heavy, moveable load may and also has to be anchored in the floor of the loading surface. However, this is not possible with all loaded goods, for example with relatively lightweight piece goods, such as packages, or is at least associated with an increased expenditure of labour, as there is, for example when using nets. Displacing of the load takes place when traveling around tight corners when the unsecured load presses with approximately half of its weight against the side wall of the structure. It has been established that relatively flexible side walls, such as reinforced tarpaulins, may sag laterally by up to 50 cm in such cases.

Roofs with a braided cable in the covering frame are known from practice. Furthermore, reinforced roof tarpaulins are known from practice. However, the latter do not reliably conduct away forces which are being applied, but rather are too elastic, susceptible to wear and expensive.

WO 00 12 337 A1 describes a vehicle structure which is embodied as a sliding-hoop-type covering, in which sliding hoops in the form of an inverted U can be shifted along both longitudinal sides of a loading platform and essentially cover the loading surface. Although a vehicle structure of this type is flexible as regards the loading options, the side walls of the vehicle structure are severely bent outward if the load slips.

WO 00 12 334 A1 describes a sliding covering, in which bows can be shifted via rollers along longitudinal members, which are supported on the loading platform via stakes, to open up a roof opening. Furthermore, side tarpaulins can be displaceably suspended on the longitudinal members. Owing to the extent of the stake, the load in the roof region acts with a large lever on the longitudinal member, in particular in the central region thereof. In the case of longitudinal members which are supported from a plurality of sections of longitudinal-member profiles that are arranged one behind another and are supported in each case on stakes, the supporting on relatively strong transverse members is insufficient to get out the longitudinal members, for which reason the bending outward achieves impermissibly high values.

EP 0 936 093 A1 shows a sliding-hoop-type covering, in which, in the region of the side walls and of the roof, rigid stiffening struts are arranged diagonally between adjacent sliding hoops, it being possible for at least one end of the stiffening elements to be shifted in a guide in such a manner that adjacent sliding hoops can come into contact with one another. A transfer of weight forces which act outward on the side walls is not possible with these stiffening elements.

DE 197 56 865 A1 describes a vehicle structure, in which a covering frame comprising longitudinal members which are supported toward the loading platform by stakes covers a loading area, a roof tarpaulin for covering a roof opening being fastened to bows spanning the two longitudinal members, and it furthermore being possible for side tarpaulins to be fitted in each case into the longitudinal members. To avoid lateral sagging, rigid false floors which stiffen the vehicle structure are fitted into the stakes. Furthermore, the vehicle structure has a complex arrangement of stiffening elements which are designed as a chain or cable and which are fitted, on one side, to a fixed roof part and, on the other side, are fastened to a carriage which can be moved along the longitudinal edge of the roof, as a rule on a somewhat wider end bow which is intended to bring about the parallel guidance of the bows. These stiffening elements are deflected on the bows a number of times from the one side to the other side in each case of the covering frame, diagonally spanning the surface of the loading area, two diagonally extending stiffening elements being deflected in each case at both ends of the same bow, and the stiffening element engaging with both of its ends in the region firstly of the one longitudinal member and secondly of the other of the two longitudinal members. Furthermore, further stiffening elements are stretched parallel to the longitudinal members in ring eyelets in which the diagonally extending stiffening elements are also deflected. Due to the large length of the stiffening elements and because the latter have to be designed to absorb all forces, the stiffening elements have a great thickness, as a result of which the folding of the tarpaulin is impaired. Although, in the known vehicle structure, the stiffening elements bring about a connection between the two longitudinal members, the two longitudinal members buckle in the same direction when subjected to a load, with the result that the vehicle structure buckles in the central region in the manner of a banana—in fact, buckles at two points as the two longitudinal members yield, or even becomes twisted. A further significant disadvantage resides in the fastening of the ends of the stiffening elements to the final bow, since the entire load transferred via the stiffening elements stresses the bearings of the rollers and correspondingly reduces the service life of the rollers. The same applies to the bows on which the eyelets for the deflection of the stiffening elements are provided and the rollers of which have to transfer the entire load acting on the stiffening element to the longitudinal member, which rapidly causes damage to the bearings of the horizontally guided rollers and, accordingly, the stiffening of the roof region is again reduced. Finally, the multiple deflection of the flexible stiffening elements defines a parallelogram of traction that is unable to transfer thrust forces to the opposite longitudinal member to compensate for forces acting on one longitudinal member, and so the stiffening elements expand the one side, as a result of which excessive forces can be introduced into the tarpaulin and the latter can be damaged.

SUMMARY OF THE INVENTION

It is an object of the present invention to provide a vehicle structure which offers increased resistance to lateral sagging.

For the roof skin mentioned at the beginning, at least one flexible reinforcing member is fixed to a front corner region of the covering frame and to a rear, moveable bow in the region of the same longitudinal side, and that the at least one flexible reinforcing member is secured in at least one point of traction in a region of the other longitudinal side.

The vehicle structure according to the invention avoids having a stiffening element or reinforcing member spanning the roof opening, in the closed state of the roof, diagonally, i.e. from one corner into the diametrically opposite corner, and instead provides an arrangement in which regions of a longitudinal member that are particularly at risk due to bending outward are coupled to two particularly stable locations in the region of the opposite longitudinal member.

In the vehicle structure according to the invention, a first end of the at least one reinforcing member is always arranged in a front corner region in the closed state of the covering, thus, in a sliding covering, in the region of the intersection formed by corner post, front transverse member and longitudinal member, and fixed either to the longitudinal member or to the transverse member. In this case, the other end of the at least one reinforcing member is arranged on the same longitudinal side in the region of the rear corner region which is arranged by the corner post, rear transverse member and the same longitudinal member as for the front corner region, where, in contrast to the preferred, positionally fixed connection in the front corner region, in the rear corner region the connection is to a part which is provided for opening up the roof and can be shifted along the longitudinal sides, for example to the rear bow or else to an element which is arranged on the rear bow and, in the closed state of the covering, grips behind positionally fixed parts preferably in a form-fitting and/or frictional manner, and otherwise can be moved by the bows after it has been lifted a little, for example, from the position in which it grips behind them. An element of this type is preferably the portal beam which is provided in any case in sliding coverings in order to lock the covering frame and which advantageously tensions the reinforcing member by means of the pivoting movement provided for this purpose, during closing of the covering, and relaxes it during opening. By this means, the tractive force exerted by the reinforcing member on the portal beam is introduced directly into the rear structures, such as the corner posts, against which the portal beam is supported, as a result of which the forces are not introduced into the particular guide by the rollers of the rear bow and the bearings thereof, which increases the service life of the rollers.

The point of traction is preferably arranged on a bow on which the reinforcing member is deflected, so that in the point of traction arranged in the vicinity of the other longitudinal side, tractive forces are effective in the direction of the one longitudinal side while the remaining bows outside the point of traction do not experience a deflection of this reinforcing member. Although the discussion concerns one point of traction, the latter may also be extended one-dimensionally over a section by a first deflecting region and a second deflecting region on the other longitudinal side being provided, for example, in two bows which preferably are, but do not absolutely have to be, adjacent, so that the section between the two bows, instead of the pattern which forms in plan view the two limbs of a triangle where the one longitudinal side is the base, instead places a trapezium on this base.

More than just a single reinforcing member, for example two, three or more, are preferably provided on one longitudinal side, which further reinforcing members are assigned in each case to a point of traction. Thus,. in the case of two reinforcing members, the point of traction of the first reinforcing member can be provided in the region of approximately one third of the length of the loading area and the point of traction of the second reinforcing member can be provided in the region of approximately two thirds of the length of the loading area. This makes it possible to select more flexible reinforcing members for the transfer of the same overall forces, which reinforcing members can be bent more easily during opening of the covering frame. The plurality of reinforcing members preferably originate from the same points of the one longitudinal side.

The invention permits reinforcement and stiffening of the flexible roof skin in the lateral direction when the roof is closed without substantially impairing the flexibility of the roof skin in the longitudinal direction. This improved stiffness is obtained by a simple, cost-effective and virtually maintenance and wear-free structure.

If at least two reinforcing members are arranged crossing over each other and in a longitudinally symmetrical, at least double X shape, then optimum stiffening in both transverse directions and over longer supporting frames is obtained.

If, in a sliding covering, the roof skin is used with a front end wall hood and/or a rear portal beam, which can be displaced on the longitudinal members, then the cross member can be formed by the front end hood and/or by the portal beam. The opening function of the roof can then be fully maintained without any restriction to operation, and the tensioning of the reinforcing member takes place synchronously with the closing by displacement of the roof.

The operation is even simpler and easier if in at least one pivotable portal beam, the reinforcing member is fastened to the portal beam. The fastening can then be designed using simple means, similar to a lever lock, in a such a manner that the reinforcing member is tensioned by the portal beam pivoting into the closing position.

To monitor the closing function, provision may be made for the arrangement of an electric contact device which is actuated by pivoting of the portal beam. Correct closure of the portal beam, on the one hand, and correct tensioning of the reinforcing member, on the other hand, can then be established at the same time.

If there is a flexible rear end, the reinforcing members can be continued and can also be used in the manner of diagonal bracing to reinforce the flexible rear region.

So that the reinforcing member can be adapted to a telescopic roof skin without any disturbance, the reinforcing member is connected to the roof skin. If at least one bow which can be displaced along the longitudinal members is provided, the same purpose is served by the reinforcing member being connected to the bow.

The rollers, which are conventional in bows of a sliding covering and take on the lateral guidance, are preferably omitted when the reinforcing member is fastened to the longitudinal member, i.e. in the case of that part which couples of the point of traction to the longitudinal member, as a rule a bow. This bow is fastened to the longitudinal member via sheet-like sliding elements instead. The latter can better absorb the forces which occur during tensioning of the reinforcing member and can pass them into the longitudinal member.

The reinforcing member can be fastened to the points of intersection or end points by means of rapid connecting means, such as spring hooks.

A reinforcing member which is designed as a steel cable encased with plastic satisfies all requirements. It is flexible, has a long life and is maintenance-free.

The invention therefore provides a vehicle structure, the side walls of which exhibit only a slight sagging when subjected to a load by loaded goods.

A loadable side wall is preferably arranged between the longitudinal members and the vehicle chassis. This side wall may be connected fixedly, but releasably, to the longitudinal members and the vehicle chassis. This can take place by the side wall being designed as a tarpaulin reinforced with transverse bows or stakes. The forces acting on the side wall are deflected on the one hand downward into the rigid vehicle chassis and on the other hand upward into the longitudinal members. The stiffening of the roof means that the longitudinal members, and therefore the side walls connected to them, are no longer able to sag to such a great extent. This structure is particularly suitable for transporting piece goods or drinks crates, since lateral load-securing forces are readily absorbed and the stiffening of the moveable roof surfaces when traveling is ensured without impairing the opening function for the loading operation.

Further advantages and features of the invention emerge from the following description and from the dependent claims.

BRIEF DESCRIPTION OF THE DRAWINGS

The invention will be explained in greater detail below using a preferred exemplary embodiment and with reference to the attached drawings.

FIG. 6 shows the rear end region of the vehicle structure from FIG. 2 with the portal beam swung up.

FIG. 7 shows the end region from FIG. 6 with the portal beam swung down.

FIG. 8 shows the end region according to FIG. 6 in plan view and on an enlarged scale.

DETAILED DESCRIPTION

Figure 1:
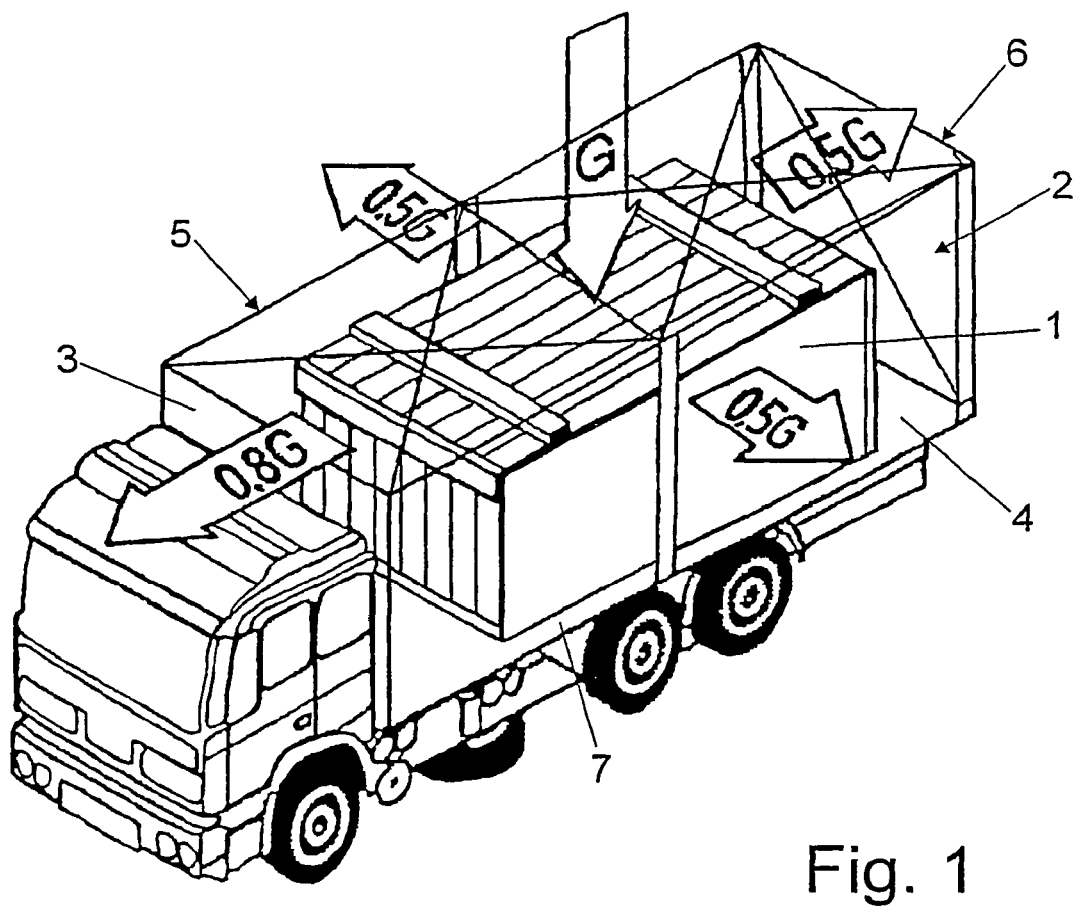
FIG. 1 shows a perspective view of a loaded truck with a structure which is shown transparently.

FIG. 1 shows the manner in which the weight G of the load 1 of a utility vehicle can act on the structure 2: 0.8 G act forward on the front wall 3 and 0.5 G act in each case on the side walls 4 and 5 and on the rear wall 6. These values can arise during corresponding circumstances, such as braking, cornering and acceleration, and have to be introduced into the vehicle chassis.

Figure 2:
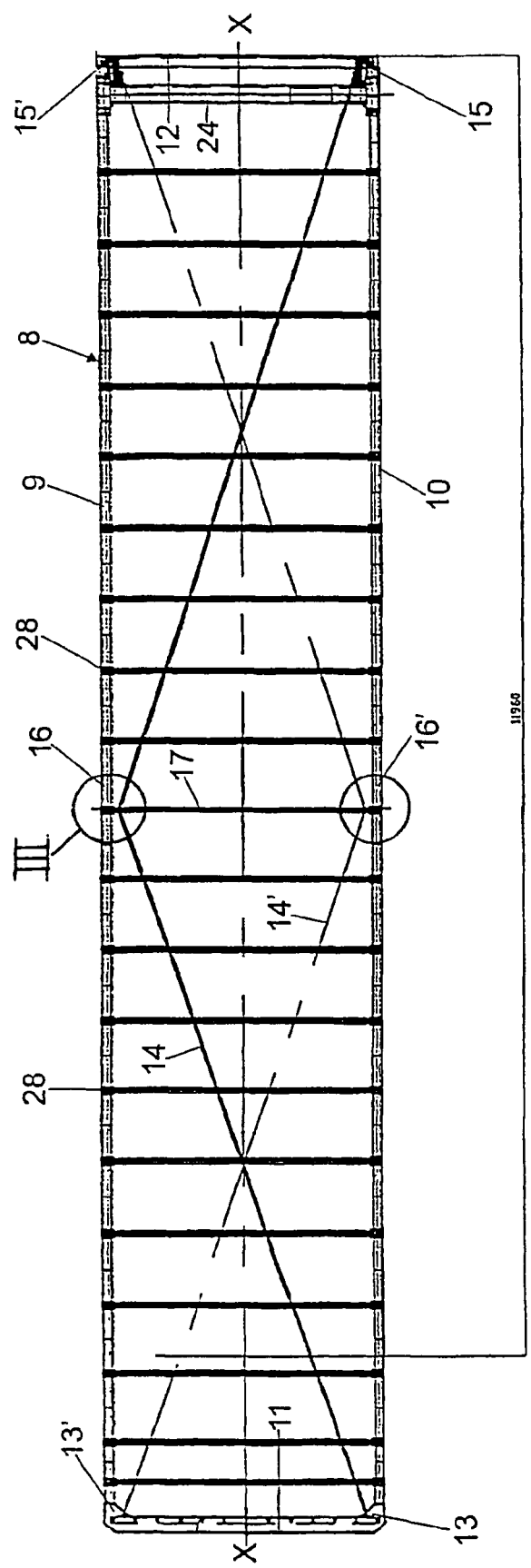
FIG. 2 shows a plan view of a vehicle structure according to the invention.

In FIG. 2, a rectangular supporting frame 8 of a sliding covering comprises two longitudinal members 9 and 10 and a front and a rear transverse member. The front transverse member is designed as a front end hood 11, the rear transverse member is a pivotable portal beam 12. In the region of intersection 13, i.e. longitudinal member 10/transverse member 11, one end of a reinforcing member in the form of a cable 14 encased with plastic is fastened to the longitudinal side of the supporting frame 8. In the region of intersection 15, i.e. longitudinal member 10/portal beam 12, the other end is fastened to the same longitudinal side of the supporting frame 8. The fastening can take place via any desired means or rapid fastening means, such as spring hooks.

Figure 3:
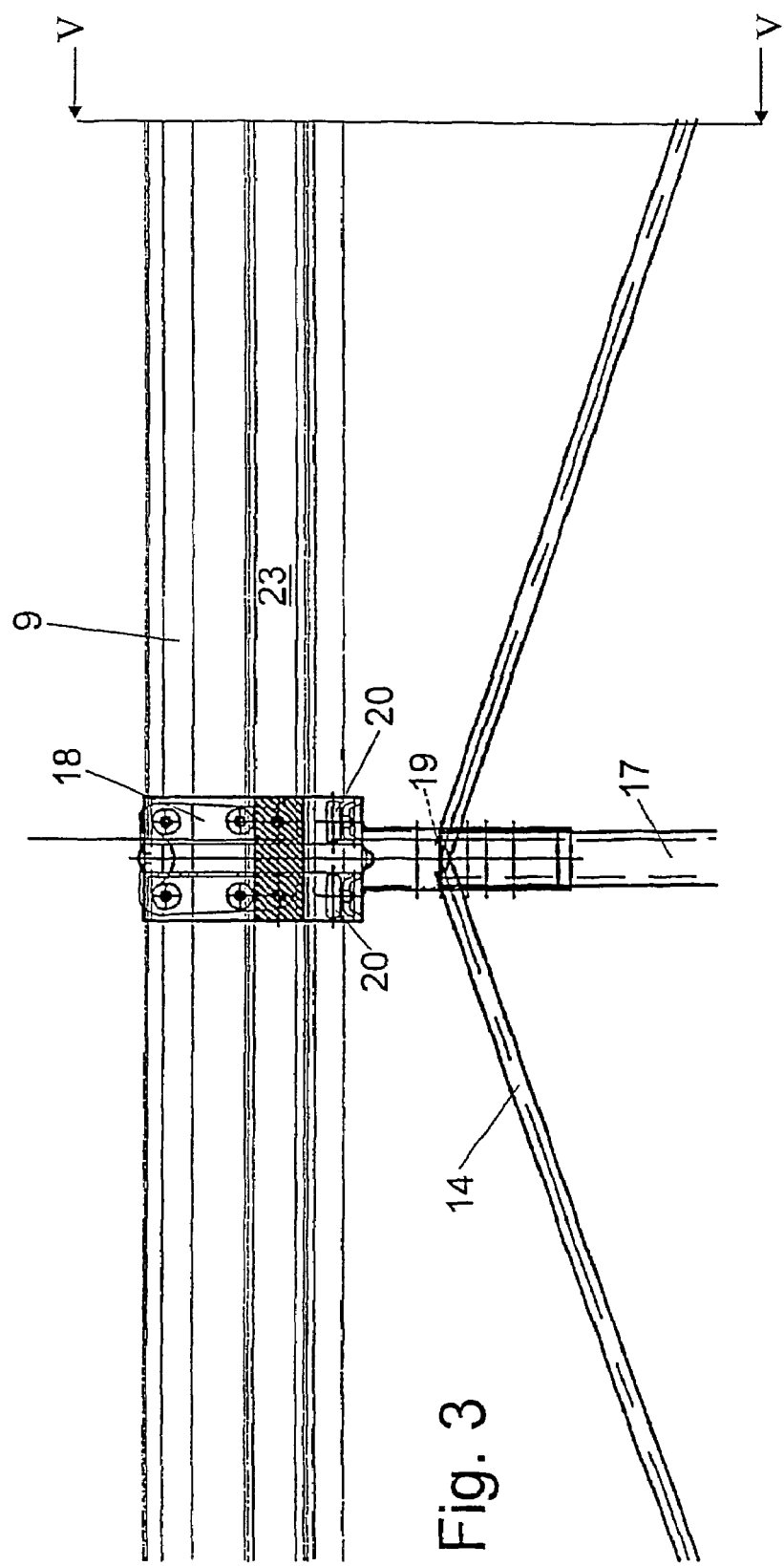
FIG. 3 shows an enlarged detail III from FIG. 2 in the region of the connection of a reinforcing member to a longitudinal side.
Figure 5:
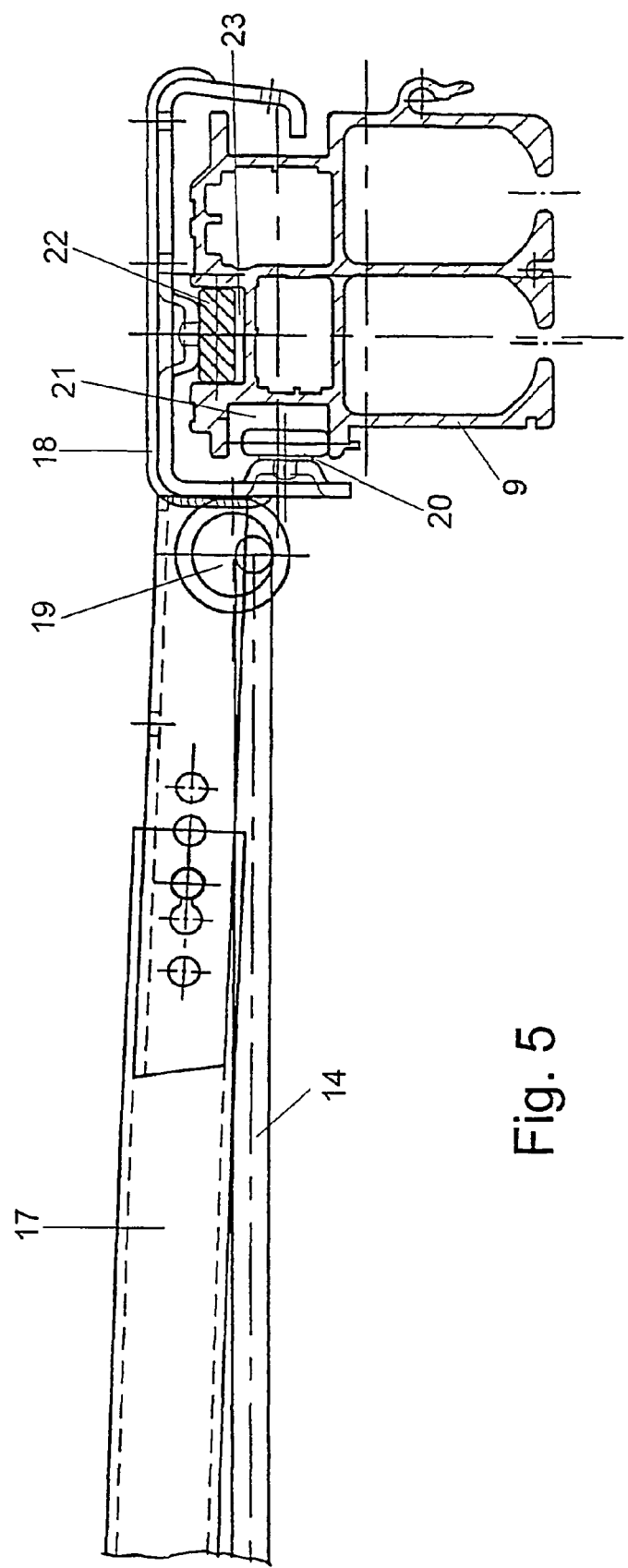
FIG. 5 shows a partially cutaway side view corresponding to the line V—V in FIG. 3.

The cable 14 is fastened in its central region to the central intermediate region 16 of the other longitudinal member 9; greater detail can be gathered from FIGS. 3 and 5.

A second cable 14', which is arranged exactly symmetrically with respect to the longitudinal axis X—X of the supporting frame 8, is indicated together with the intersections 13' and 14' and the central intermediate region 16' of the longitudinal member 10. The two cables 14 and 14' crossover each other and together form a double X shape. As a result, the supporting frame 8 is reinforced and stiffened uniformly in its main plane.

The manner in which the cable 14 is fastened to a bow 17 which, in turn, ends in the form of a roller carriage 18, can be seen in FIGS. 3 and 5. In this case, the cable 14 is guided through a hole 19 in the bow 17. The cable 14 is preferably fixed in the hole 19 in order to avoid slipping. The roller carriage 18 runs with two vertical rollers 20 in a lateral guide rail 21 and slides via an elongate, sheet-like sliding element 22 in an upper guide rail 23 of the longitudinal member 9.

Figure 4:
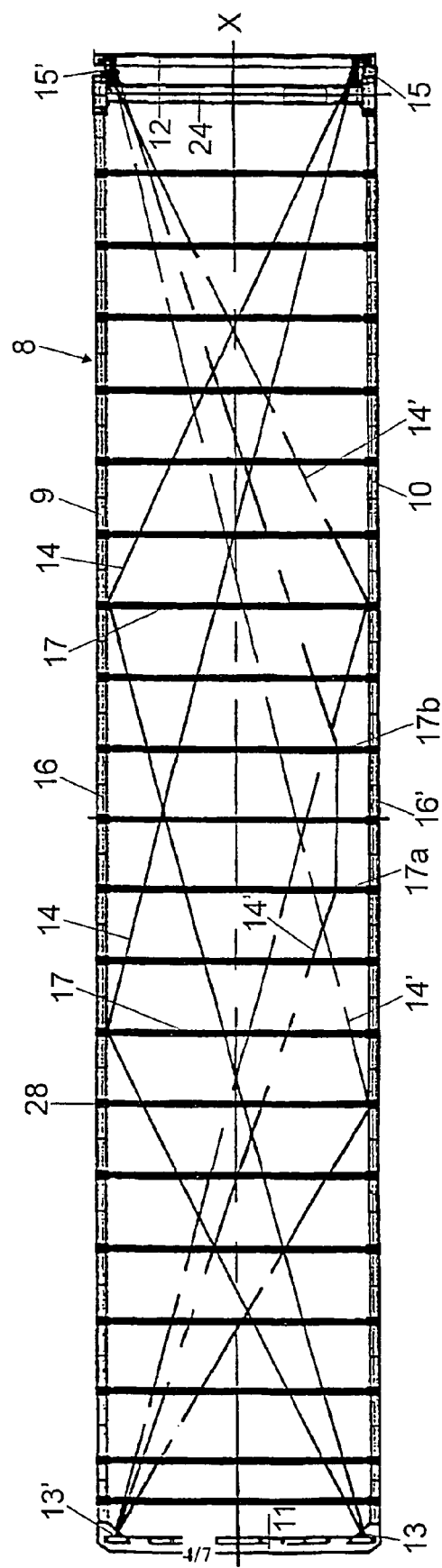
FIG. 4 shows a plan view of an alternative vehicle structure according to the invention.

FIG. 4 shows an alternative configuration of a vehicle structure, in which two cables 14 emerge in each case at the same intersections 13, 15 and are fixed to two different points of traction 19 of two bows 17 which divide the length of the loading surface approximately into thirds. Furthermore, three cables 14 are shown: a first engages on the same bow as one of the cables 14, another cable 14' engages on an adjacent bow to that of the cable 14 and a further cable connects points of traction 19 of a bow 17a and of a bow 17b, with the result that instead of the triangle of intersection—point of traction—intersection, a trapezium of intersection—point of traction—point of traction—intersection is produced.

The manner in which the cable 14 is fastened in the point of intersection 15 to the upwardly pivoted, opened portal beam 12 is shown in FIG. 6. The portal beam 12 is articulated on a further, longitudinally displaceable transverse member 24 via two joints 25. The opening movement is assisted by a gas-filled spring 26.

In FIG. 7, the portal beam 12 is swung down and locked to a support 27. The length of the cable 14 is configured and set in such a manner that the cable 14 obtains its final tensioning when the portal beam 12 is swung down.

FIG. 2 shows, in a sliding covering, the manner in which a multiplicity of bows (reference numbers omitted) can be arranged between the longitudinal members 9 and 10, which in turn support the roof skin (not illustrated), for example a tarpaulin. The bows 28 and the roof skin can be connected to the cable 14, preferably at points or in sections.

FIG. 8 illustrates an electric contact device 29 which is brought into its closing position, FIG. 7, by the pivoting of the portal beam 12 and, as a result, can use corresponding indicating means to signal a correct closing state of the portal beam 12 and the correct bracing of the cable 14.

The invention has been explained above with reference to an exemplary embodiment which is embodied as a sliding covering. It has to be understood that the invention can similarly be used on a vehicle structure embodied in the manner of a sliding-hoop-type covering.

A vehicle structure according to the invention having a loading platform for the stacking of loaded goods over which is built a frame on which a tarpaulin rests, and in which either only bows of the roof can be shifted along longitudinal members, which are supported toward the loading platform via stakes, or bows of the roof are connected to stakes which can be shifted along the loading platform, and can be shifted together with said stakes, therefore comprises, according to the concept of the invention, at least one flexible reinforcing member in the plane of the bows, preferably designed as a cable, for example as a steel cable, which reinforcing member forms at least one triangle which, by means of at least one first corner point on one side of the frame, distributes a loading to two further corner points on the other side of the frame (when the frame is closed). The two further corner points, but at least one of the two, expediently lie in the region of an upper corner of the frame. In addition, provision may be made for the cable to be guided in the region of the bows, which are crossed from corner point to corner point, on the latter in order to avoid a large amount of slack when the frame is opened. The at least one corner point supports the cable if appropriate with a deflecting member. If two cables are provided, as a triangle respectively, so that a cable is fixed in each of the four upper corners of the frame, a profile corresponding to a double X is produced in plan view. The two at least one corner points of the two triangles then expediently lie opposite each other and preferably in the region of a bow.

The invention has been described above with reference to a reinforcing member embodied as a continuous cable. It has to be understood that the reinforcing member may also be formed from a plurality of sections of reinforcing cables.

What is claimed is:

1. A vehicle superstructure of a utility vehicle, comprising:
   a loading platform, said loading platform having a first longitudinal side and a second longitudinal side,
   a covering frame supported on said loading platform,
   a plurality of bows displaceable along said first and second longitudinal sides,
   a tarpaulin attached to at least said plurality of bows, and
   a first flexible reinforcing member arranged in an upper region of the covering frame in order to stiffen the superstructure,
   wherein said first flexible reinforcing member is fixed to a front corner region of the covering frame and to a rear one of said plurality of bows in a region of the first longitudinal side, and
   wherein said first flexible reinforcing member is secured in at least one point of traction in a region of the second longitudinal side.

2. The vehicle superstructure as claimed in claim 1, wherein the point of traction is arranged in one of said plurality of bows.

3. The vehicle superstructure as claimed in claim 2, further comprising a roller carriage assigned to the point of traction, and wherein said one of said plurality of bows has, on the roller carriage assigned, a sliding element for guiding said one of said plurality of bows, and wherein tractive forces from the point of traction are introduced via said one of said plurality of bows and said sliding element into an upper longitudinal member of the second longitudinal side.

4. The vehicle superstructure as claimed claim 1, further comprising a portal beam arranged on said rear one of said plurality of bows and wherein said first flexible reinforcing member is fixed to the portal beam.

5. The vehicle superstructure as claimed in claim 4, wherein, when the covering frame is closed, the portal beam rests on rear supports of the covering frame.

6. The vehicle superstructure as claimed in claim 4, wherein the portal beam permits a pivoting movement during a transfer from closed covering frame to open covering frame.

7. The vehicle superstructure as claimed in claim 1, wherein the covering frame is a sliding covering comprising longitudinal members supported toward the loading platform on posts and stakes, and wherein the plurality of bows can be moved along said longitudinal members.

8. The vehicle superstructure as claimed in claim 1, wherein the covering frame is a sliding-hoop-type covering, in which the bows are in the form of sliding hoops supported on the loading platform, wherein the bows can be moved on both longitudinal sides of the loading platform.

9. The vehicle superstructure as claimed in claim 1, wherein said first flexible reinforcing member is fixedly attached to said point of traction.

10. The vehicle superstructure as claimed in claim 1, wherein said first flexible reinforcing member is loosely guided through said point of traction.

11. The vehicle superstructure as claimed in claim 1, further comprising a second flexible reinforcing member crossing over said first flexible reinforcing member in a longitudinally symmetrical, double X shape.

12. The vehicle superstructure as claimed in claim 1, further comprising, on the first longitudinal side at least one further flexible reinforcing member fixed to said front corner region of the covering frame and to said rear one of said plurality of bows, and wherein the further flexible reinforcing member is secured in a further point of traction in another region of the other longitudinal side.

13. The vehicle superstructure as claimed in one of claims 1, wherein the first flexible reinforcing member is fastened to the points of intersection or end points by means of rapid connecting units.

14. The vehicle superstructure as claimed in claim 13, wherein the first reinforcing member includes a steel cable encased with plastic.

15. The vehicle superstructure as claimed in claim 1, wherein the first reinforcing member is continued and further reinforces a flexible rear region of the covering frame in a manner of a diagonal bracing.

16. The vehicle superstructure as claimed in claim 1, wherein the first reinforcing member is attached to the tarpaulin.

17. The vehicle superstructure as claimed in claim 1, wherein the first reinforcing member is integrated in the tarpaulin.

18. The vehicle superstructure as claimed in claim 1, wherein the first reinforcing member is guided in a region of the bows provided outside the point of traction through bushings which do not absorb any tractive forces when the reinforcing member is tensioned.

19. The vehicle superstructure as claimed in claim 1, wherein the first flexible reinforcing member is resistant to being extended.

20. A flexible roof skin, comprising
    at least one reinforcing member which is resistant to being extended, wherein the roof skin is supported on a rectangular supporting frame comprising two longitudinal members and two transverse members and said supporting frame is supported on a vehicle chassis via supports,
    wherein said at least one reinforcing member on one longitudinal side of the supporting frame is connected in a positionally fixed manner in the regions of intersection of longitudinal member/transverse member and, on another longitudinal side, is connected in a longitudinally displaceable manner to an intermediate region of the other longitudinal member of the supporting frame, said intermediate region lying between the corresponding regions of intersection.

21. A vehicle structure, comprising
    a loading platform having a first longitudinal side and a second longitudinal side, a plurality of bows displaceable in parallel to said first longitudinal side and said second longitudinal side, a roof tarpaulin attached to said plurality of bows, and a first flexible reinforcing member and a second flexible reinforcing member arranged in a vicinity of said roof tarpaulin, wherein said first flexible reinforcing member is fixed in a vicinity of said first longitudinal side both to a first front corner of the vehicle structure and to a rear bow, and wherein said first flexible reinforcing member is attached in a vicinity of said second longitudinal side to a first point of traction, and wherein said second flexible reinforcing member is fixed in a vicinity of said second longitudinal side both to a second front corner of the vehicle structure and to said rear bow, and wherein said second flexible reinforcing member is attached in a vicinity of said first longitudinal side to a second point of traction.

22. The vehicle structure as claimed claim 21, wherein a portal beam is arranged on said rear bow.

23. The vehicle structure as claimed in claim 21, wherein said plurality of bows is displaceable along longitudinal members, said longitudinal members being supported toward the loading platform via a plurality of posts.

24. A vehicle superstructure of a utility vehicle, comprising a loading platform, said loading platform having a first longitudinal side and a second longitudinal side, a covering frame supported on said loading platform, a plurality of bows displaceable along said first and second longitudinal sides, a tarpaulin attached to at least said plurality of bows, and a plurality of flexible reinforcing members, each of said flexible reinforcing members being arranged in an upper region of the covering frame and being attached to a front corner of the covering frame and to a rear bow of said plurality of bows in a region of one of the first longitudinal and second longitudinal sides, and wherein each of said plurality of flexible reinforcing members includes one portion assigned to an intermediate position of the other of the first and second longitudinal sides.

25. The vehicle superstructure as claimed in claim 24, wherein said flexible reinforcing members comprise a steel cable.

26. The vehicle superstructure as claimed in claim 24, wherein said intermediate position of said other of the first and second longitudinal sides is arranged approximately in the middle between a front corner of the covering frame and said rear bow.

27. The vehicle superstructure as claimed in claim 24, wherein at least two flexible reinforcing members are assigned to said corner and said rear bow, and wherein the respective intermediate positions of each of said at least two flexible reinforcing members are spaced apart from each other.

* * * * *